United States Patent Office 3,686,020

Patented Aug. 22, 1972

3,686,020

ELECTROLESS NICKEL PLATING ON GLASS

Miguel Coll-Palagos, Rye, N.Y., assignor to Stauffer Chemical Company, New York, N.Y.

No Drawing. Continuation of abandoned application Ser. No. 687,447, Dec. 4, 1967. This application Nov. 4, 1970, Ser. No. 86,963

Int. Cl. C23c 3/02

U.S. Cl. 117—54 14 Claims

ABSTRACT OF THE DISCLOSURE

An adherent coating of electroless nickel plate on glass is obtained using an acidic electroless plating solution having a pH within the range of about 5.0 to 7, which solution contains borate ions, fluoride ions and an ion of an organic hydroxycarboxylic acid such as glycolate ion. The use of a hydrofluoric acid etch prior to plating further improves adhesion.

CROSS REFERENCE TO RELATED APPLICATION

This application is a streamlined continuation of application Ser. 687,447, filed Dec. 4, 1967 and now abandoned.

The present invention relates to electroless plating of nickel on glass and to the provision of adherent and bright deposits of nickel which can be used for mirrors or for one-way glass, or for non-glare mirrors.

The process for plating nickel by chemical reduction or "electrolessly" is a well known process which is taught to be useful on numerous electrically non-conductive bases including glass. While the basic process has found extensive use in plating other electrically non-conductive bases such as plastic, it has found little use in plating glass in that the nickel plate does not adhere sufficiently to the glass surface to provide a commercially saleable product. Also, processing difficulties of flaking during plating and the provision of bright, attractive plates have further limited the desirability of using the electroless plating technique to plate on glass. Other methods of plating glass such as by sputtering under vacuum are presently used but these methods require expensive equipment and for that reason are economically disadvantageous.

It has now been found that glass can be electrolessly plated with nickel plate to provide a plate which is sufficiently adherent to the glass, which plate is sufficiently bright and reflective so as to allow its use in mirrors and which plate is sufficiently easy to apply so as to overcome the prior art difficulties in effecting the electroless plating of glass.

In accordance with the present invention, adherent coatings of electroless nickel plate to glass are obtained by utilizing an electroless plating solution maintained at a pH of between 5.0 to about 7, and containing borate ions, fluoride ions, and ions of an organic hydroxycarboxylic acid such as glycolate ions. It has also been found that if the glass to be plated is slightly etched in a hydrofluoric acid bath prior to plating, that adhesion is further improved.

The glass for use in the present invention can be any one of a number of the hard, amorphous, brittle materials obtained by fusing and solidifying silicates of the alkaline earth or heavy metals. Such glasses can be illustrated by potash-lime glass, soda-lime glass, potash-lead glass, bottle glass, opaque glass, thalium glass, borosilicate glass, and the like. The glass can be opaque or colored as is well known in the art of glass making. The glass can be of the laminated safety glass type, it can be rolled, float molded, blown, etc. The choice of the glass depends on the final use and, in the formation of mirrors, a glass such as an optical grade borosilicate type glass having little imperfection is preferred. In essence, any type of the known silicate glasses can be utilized and the selection of the glass is made in accordance with the final desired use of the plated product.

Prior to electrolessly plating the glass with nickel, it is preferred that the glass be completely clean in order to remove any agents on the surface of the glass which might unduly effect the adherence of the nickel plate to the glass. This can be accomplished by immersing the glass in a cleaning solution such as a mild non-silicated alkaline cleaner.

Following the cleaning of the glass, it is preferred that the glass be slightly etched in a mild hydrofluoric acid etching solution prior to plating. Preferably, the hydrofluoric acid etching solution contains less than 10% HF and more preferably about 5% HF. This additional etching further improves the adhesion of the nickel plate to the glass by providing tiny microscopic pits in the surface of the glass which act as adhesion sites for the electrolessly deposited nickel plate. Any other material which will slightly etch the glass can also be utilized.

The etching is generally accomplished at room temperature for 5 to 30 seconds depending on the strength of the etching bath and the amount of etch desired. Extensive etching can destroy the surface of the glass so as to provide an extremely rough electrolessly deposited nickel plate and an insufficient amount of etching will not provide the desired adhesion. Variations as to the constituents in the glass can also effect the etching rate and the total amount of etching time can easily be determined by one skilled in the art. Preferably, two etch cycles are utilized to insure proper etching of the surface.

Following the etching, the surface of the glass is rinsed in water and then the surface is activated in accordance with the general procedures of the electroless plating art. This activation procedure generally comprises immersing the glass in a solution containing stannous chloride, rinsing the base, and then immersing the base in palladium chloride so as to effect a reduction of the palladium chloride by the stannous ion, which palladium then can act as a catalytic surface for the reduction of the nickel in the electroless plating bath.

Following activation, the glass is immersed in an electroless plating bath solution which is maintained at a pH within the range of 5.0 to 7 and which solution contains borate ions, fluoride ions and ions of an organic hydroxycarboxylic acid such as glycolate ions, in addition to the normally present nickel ions and hypophosphite ions. The solution can be formed by dissolving a soluble nickel salt, preferably nickel fluoborate, in an acidic aqueous solution followed by adding hypophosphite ions derived from such compounds as sodium, potassium, magnesium, ammonium, hypophosphite, or combinations thereof. Fluoride anions can be added by salts such as sodium and potassium and ammonium fluoride, and the borate ions can be derived from boric acid and salts thereof which are added to the solution. Glycolate ions can be added by means of glycolic acid or salts thereof. A plating rate accelerator such as thiourea and acetate ions derived from acetic acid or salts thereof are also preferably added to the solution to improve stability and plating rates. Also, a wetting agent can be used if desired. A more complete description of the plating solution is set forth in copending application Ser. No. 48,836, filed June 11, 1970 which is a continuation of application Ser. No. 687,470, filed Dec. 4, 1967 and now abandoned.

The nickel salt in the electroless plating solution can be any nickel salt which is reducible under the plating conditions. Examples of such salts are nickel chloride, nickel sulfate, nickel carbonate, nickel sulfamate, nickel fluoborate and mixtures thereof. It is preferred that nickel fluoborate, nickel sulfamate and mixtures thereof be utilized as the source of nickel ion in that these ions appear to contribute to the overall adhesion of the plate in contrast to solutions containing chloride ions and/or sulfate ions. In theory, the presence of chloride ions and sulfate ions contributes to the formation of plates having internal stresses higher than plates formed in the presence of the other ions.

The quantity of nickel ion in the solution can be anywhere in the range of from 1 gram/liter to 40 grams/liter and more preferably in the range of about 7.5 to about 15 grams/liter.

The amount of hypophosphite ion in the solution is that amount necessary to effectively reduce the nickel. This amount generally relates to the amount of nickel in solution. Preferably, the amount of hypophosphite ion in grams per liter of the initial solution is between about 50 grams/liter and about 150 grams/liter.

The borate ion can be added to the solution by boric acid or salts thereof such as sodium borate. Boric oxide can also be used inasmuch as it hydrolyzes to boric acid when admixed with water.

The borate ion is desirably present in the solution in an amount ranging from about 10 grams/liter to about 50 grams/liter and preferably in the range of about 15 to about 30 grams/liter.

The ions of the organic hydroxycarboxylic acid are preferably derived from short carbon chain compounds and more preferably from glycolic acid and salts thereof. Other hydroxycarboxylic acids which can be used are hydroxypropionic acid and salts thereof, hydroxybutyric acid and salts thereof, and the like. Glycolate ions are preferred and the use of glycolic acid is preferred in order to avoid the introduction of extraneous ions into the plating solution.

The amount of organic hydroxycarboxylic acid ions used, based on glycolate ions, is preferably within the range of about 5 grams/liter to about 80 grams/liter of plating solution. More preferably, the amount of glycolate ion is in the range of from about 10 grams/liter to about 30 grams/liter.

The solution must also contain fluoride ion, preferably within the range of about 1 gram/liter to about 10 grams/liter and more preferably from 1 gram/liter to 5 grams/liter of plating solution. The fluoride ion is preferably added to the solution by the use of ammonium fluoride though other alkali fluorides such as sodium and potassium can, less desirably, be used.

The pH of the electroless nickel plating solution is required to be between 5.0 and about 7 in order to obtain good adhesion of the electroless nickel to the base glass piece. At pH's below 5.0 insufficient adhesion, flaking and blistering are obtained even in the presence of the borate ion, fluoride ion and the glycolate ion. Preferably, the pH is maintained between 5.3 and 6.5 and more preferably within the range of 5.5 to 6.0.

The glass article is allowed to remain in the electroless nickel plating bath for a time sufficient to provide the desired nickel plate on the surface of the glass. At room temperature, e.g., 30° C., about three to five minutes are generally required to deposit an effective amount of electroless nickel plate. At 50° C., good plates are obtained at one minute though plating can be continued to five minutes to increase the layer of nickel deposited on the surface of the glass. Similarly at about 80° C., good plates are obtained within the range of thirty seconds to one minute though these pieces can remain in the plating bath for longer times to effect the deposition of thicker plates if desired.

If it is desired to make an article such as a one-way mirror, the glass is to be removed from the plating solution before a substantially complete nickel layer has been deposited on the glass and, at 45° C., this is generally accomplished at some time between one and three minutes.

The invention will be illustrated in the examples which follow.

EXAMPLE 1

Glass plates of approximately 1 inch x 3 inches x 1/16 inch are pretreated under the following conditions:

TABLE I

| | Temperature, ° C. | Time: Minutes | Time: Seconds | Water[1] rinses |
|---|---|---|---|---|
| 1. Cleaner-mild non-silicated alkaline | 65 | 5 | -------- | 2 |
| 2. Etch 5% HF solution | RT | -------- | 15 | 1 |
| 3. Etch 5% HF solution | RT | -------- | 15 | 2 |
| 4. Sensitizing, $SnCl_2$ | RT | -------- | 45 | 2 |
| 5. Activation, $PdCl_2$ | RT | -------- | 30 | 2 |

[1] Cold water rinse.

Following pretreatment, the glass plates are immersed in one of the electroless plating solutions tabulated below in Table II. The pH of each solution is adjusted to a pH range of between 5.3 and 6.5 with ammonia. Good nickel plates are obtained from each solution. Plating temperature is 50° C.

TABLE II

| Components | Solution A | Solution B | Solution C | Solution D |
|---|---|---|---|---|
| Nickel fluoborate, | 42 | 22 | -------- | 84 |
| Nickel sulfamate, g./l | -------- | 26 | 63 | -------- |
| Sodium hypophosphite, g./l | 100 | 100 | 150 | 100 |
| Boric acid, g./l | 20 | 20 | 30 | 40 |
| Acetic acid (glacial), g./l | 16 | 16 | 16.8 | -------- |
| Glycolic acid, g./l | 14 | 14 | 31.5 | 35 |
| Ammonium fluoride, g./l | 4 | 4 | 9 | 6 |
| Thiourea, p.p.m | 0.3 | 0.3 | -------- | 0.3 |
| Wetting agent[1] g./l | 0.4 | 0.4 | 0.6 | 0.2 |

[1] A noninonic surfactant having the formula:

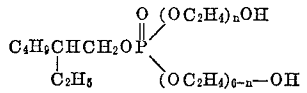

sold under the name of VICTAWET-12.

EXAMPLE 2

Glass plates of approximately 1 inch x 3 inches x 1/16 inch are pretreated using the procedure set forth in Table I hereinbefore. Following pretreatment, the plates are immersed in an electroless plating solution. Various times and plating temperatures are utilized. Condition of the electrolessly deposited nickel plate during plating is noted. A post plating adhesion test is also conducted wherein the plated glass samples are subjected to the force of flowing tap water (50 to 70 pounds/sq. in.) to determine if the nickel plate has sufficient adherence to the glass. The results are reported in Table III below.

TABLE III

| | Plating at 30° C. | | | Adhesion test |
|---|---|---|---|---|
| | 30 sec. | 1 min. | 5 min. | |
| Solution: | | | | |
| A | Faint | Slight | Normal | Passed.[1] |
| B | do | do | do | Do. |
| Commercial solution: | | | | |
| 1 | No plating | No plating | No plating | |
| 2 | do | do | do | |
| | Plating at 50° C. | | | |
| Solution: | | | | |
| A | Normal | Normal | Normal | Do. |
| B | do | do | do | Do. |
| Commercial solution: | | | | |
| 1 | Faint plating | Spotty plating | Flaking at 3½′ | |
| 2 | No plating | No plating | No plating | |
| 3 | Plates, flaking | Plates, flaking | Plates, flaking | |
| | Plating at 80° C. | | | |
| Solution: | | | | |
| A | Normal | Normal | Normal | |
| B | do | do | | |
| Commercial solution: | | | | |
| 1 | do | Flaked | Flaked | |
| 2 | do | Normal | Normal | Failed. |
| 3 | Flaked | | | |

[1] No delamination of plate under pressure of flowing water.

As can be seen from the results, good adherent plates of nickel to glass is accomplished at room temperature in contrast to the commercially available solutions which provided no plating, and at 50° C. good non-flaked plates are obtained with good adhesion.

EXAMPLE 3

Variations in pH and ingredients of two electroless plating solutions were made and the results of these variations in glass plating are reported below. One of the solutions used is a commercial propriatory electroless nickel plating solution of unknown composition and the other is a nickel sulfate solution of the following composition:

TABLE IV

Solution E

| Components: | Amount in grams/liter |
|---|---|
| Nickel sulfate | 24 |
| Sulfuric acid | 3.6 |
| Acetic acid (glacial) | 15 |
| Sodium hydroxide | 10 |
| Sodium hypophosphite | 16 |

Glass slides were pretreated according to the procedure set forth in Table I of Example 1. The results are as follows:

TABLE V.—NICKEL SULFATE SOLUTION E

| Run | 1 | 2 | 3 | 4 | 5 | 6 | 7 | 8 | 9 |
|---|---|---|---|---|---|---|---|---|---|
| pH | 4.8 | 5.5 | 6.0 | 5.1 | 5.0 | 5.0 | 6.0 | 4.75 | 6.0 |
| Temperature | 64 | 64 | 64 | 68 | 68 | 68 | 62 | 62 | 62 |
| Borate ion, g./l. | | | | 6 | 6 | | 20 | 20 | 20 |
| Fluoride ion, g./l. | | | | | | | 2 | 2 | 2 |
| Glycolate ion, g./l. | | | | | 4.2 | 4.2 | 14 | 14 | 14 |
| Flaking during plating | (1) | (2) | (3) | (1) | (3) | (3) | (3) | (3) | (3) |
| Adhesion test (flowing water) | Fail | Fail | Fail | Fail | Fail | Fail | Pass | Fail | Pass |

COMMERCIAL ACIDIC SOLUTION

| Run | 1 | 2 | 3 | 4 | 5 | 6 | 7 | 8 | 9 | 10 | 11 | 12 | 13 |
|---|---|---|---|---|---|---|---|---|---|---|---|---|---|
| pH | 4.5 | 5.0 | 5.1 | 5.2 | 5.5 | 6.0 | 5.0 | 5.0 | 5.75 | 5.75 | 6.0 | 4.75 | 6.0 |
| Temperature | 64 | 64 | 64 | 64 | 64 | 64 | 68 | 68 | 62 | 62 | 62 | 62 | 62 |
| Borate ion, g./l. | | | | | | | | | | 20 | 20 | 20 | 20 |
| Fluoride ion, g./l. | | | | | | | | 1 | | | 2 | 2 | 2 |
| Glycolate ion, g./l. | | | | | | | 4.2 | 4.2 | 4.2 | 14 | 14 | 14 | 14 |
| Flaking during plating | (1) | (1) | (1) | (1) | (3) | (3) | (3) | (3) | (3) | (3) | (3) | (1) | (3) |
| Adhesion test (flowing water) | Fail | Fail | Fail | Fail | Fail | Fail | Fail | Fail | Fail | Fail | Pass | Fail | Pass |

[1] Yes. [2] Partial. [3] No.

As can be seen from the results of Table V, pH of the solution is critical to prevent flaking during plating even in the presence of borate ions, fluoride ions, and glycolate ions (see Run 8 for Solution E and Run 12 for Commercial Solution). The results also show that at the proper pH levels, all three ions (borate, fluoride and glycolate) are necessary to provide a good, adherent nickel plate.

The invention is defined in the claims which follow.

What is claimed is:

1. A method for electrolessly depositing a nickel plate on glass which comprises contacting an activated glass surface with an acidic electroless nickel plating solution comprising:

| Component: | Quantity in grams/liter |
|---|---|
| Nickel ion | 1–40 |
| Hypophosphite ion | 50–150 |
| Borate ion | 10–50 |
| Fluoride ion | 1–10 |
| Organic hydroxycarboxylic acid ions | 5–80 |
| Acetate ions | 10–25 |

said solution having a pH between about 5.0 and 7.0.

2. A method as recited in claim 1 wherein said ions of an organic hydroxycarboxylic acid are glycolate ions.

3. A method as recited in claim 1 wherein said pH is maintained between about 5.3 and about 6.5.

4. A method as recited in claim 1 wherein said pH is maintained between about 5.5 and about 6.0.

5. A method as recited in claim 2 wherein said nickel ion is present in an amount of from about 7.5 to about 15 grams/liter, said hypophosphite ion in an amount of from about 50 to about 100 grams/liter, said borate ion in an amount of from about 15 to about 30 grams/liter, said fluoride ion in an amount of from about 1 to 5 grams/liter, and said glycolate ion in an amount of from about 10 to about 30 grams/liter.

6. A method as recited in claim 1 wherein said solution further includes thiourea and a wetting agent, said thiourea being present in an amount from about 0.2 to about 0.8 part per million parts of said solution.

7. A method of electrolessly plating nickel on glass which comprises:

(1) etching the surface of said glass in a hydrofluoric acid bath;

(2) sensitizing said etched surface with $SnCl_2$;

(3) activating said sensitized surface with $PdCl_2$; and (4) contacting said activated surface with an electroless plating solution containing:

| Component: | Quantity in grams/liter |
|---|---|
| Nickel ion | 1–40 |
| Hypophosphite ion | 50–150 |
| Borate ion | 10–50 |
| Fluoride ion | 1–10 |
| Glycolate ion | 5–80 |

said solution being maintained at a pH of from 5.3 to 7.0.

8. A method as recited in claim 7 wherein said pH is maintained between about 5.3 and about 6.5.

9. A method as recited in claim 7 wherein said pH is maintained between about 5.5 and about 6.0.

10. A method as recited in claim 7 wherein said nickel ion is present in an amount of from about 7.5 to about 15 grams/liter, said hypophosphite ion in an amount of from about 50 to about 100 grams/liter, said borate ion in an amount of from about 15 to about 30 grams/liter, said fluoride ion in an amount of from about 1 to about 5 grams/liter, and said glycolate ion in an amount of from about 10 to about 30 grams/liter.

11. A method as recited in claim 7 wherein said nickel ions are derived from a nickel salt selected from the group consisting of nickel fluoborate, nickel sulfamate and mixtures thereof.

12. A method as recited in claim 7 wherein said fluoride ions are derived from ammonium fluoride.

13. A method as recited in claim 7 wherein said borate ions are derived from boric acid.

14. A method as recited in claim 7 wherein said solution further includes acetate ions, thiourea and a wetting agent, said acetate ions being present in an amount from about 10 to about 25 grams per liter of said solution and said thiourea being present in an amount from about 0.2 to about 0.8 par per million parts of said solution.

References Cited

UNITED STATES PATENTS

| | | | |
|---|---|---|---|
| 3,370,974 | 2/1968 | Hepfer | 117—47 A |
| 3,406,036 | 10/1968 | McGrath et al. | 117—160 R X |
| 3,121,644 | 2/1964 | Gutzeit et al. | 117—130 E |
| 3,281,266 | 10/1966 | Colonel | 117—130 E |
| 2,876,116 | 3/1959 | Jendrzynski | 117—130 E X |
| 2,694,017 | 11/1954 | Reschan et al. | 117—50 |
| 2,929,742 | 3/1960 | De Minjer et al. | 117—130 E |
| 3,338,741 | 8/1967 | Katz | 117—160 R |
| 3,378,400 | 4/1968 | Sickles | 117—160 R |
| 2,994,369 | 8/1961 | Carlin | 117—130 E |
| 3,489,576 | 1/1970 | Vincent et al. | 117—160 R X |
| 3,432,338 | 3/1969 | Sickles | 117—160 R X |

ALFRED L. LEAVITT, Primary Examiner

J. R. BATTEN, Jr., Assistant Examiner

U.S. Cl. X.R.

106—1; 117—124 C, 160 R

PO-1050
(5/69)

UNITED STATES PATENT OFFICE
CERTIFICATE OF CORRECTION

Patent No. 3,686,020 Dated August 22, 1972

Inventor(s) Miguel Coll-Palagos

It is certified that error appears in the above-identified patent and that said Letters Patent are hereby corrected as shown below:

Column 4, TABLE II, line 55, after the words "Nickel fluoborate," insert -- g./l --.

Columns 5 and 6, TABLE III, last column under Plating at 50° C., Solution A, the word "Do." should read -- passed --.

Columns 5 and 6, TABLE III, last column under Plating at 80° C., Solution A, insert the word -- passed --.

Column 8, Claim 14, line 14, the word "par" should read -- parts --.

Signed and sealed this 13th day of February 1973.

SEAL)
test:

DWARD M.FLETCHER,JR.
testing Officer

ROBERT GOTTSCHALK
Commissioner of Patents

43